United States Patent
Arrington-Webb et al.

(10) Patent No.: US 6,186,335 B1
(45) Date of Patent: Feb. 13, 2001

(54) PROCESS FOR BENEFICIATING KAOLIN CLAYS

(75) Inventors: Lee Ann Arrington-Webb, Sandersville; Robert A. Lowe, Milledgeville; Chris B. Maxwell, Evans; Prakash B. Malla, Dublin; Amy C. Semratedu, Sandersville; Cesar I. Basilio, Milledgeville, all of GA (US)

(73) Assignee: Thiele Kaolin Company, Sandersville, GA (US)

( * ) Notice: Under 35 U.S.C. 154(b), the term of this patent shall be extended for 0 days.

(21) Appl. No.: 09/045,765

(22) Filed: Mar. 20, 1998

(51) Int. Cl.⁷ ............... B03B 7/00; B03B 1/00; B03D 1/02; C09C 1/42
(52) U.S. Cl. ............ 209/166; 209/164; 209/5; 209/10; 209/12.1; 209/39; 501/149; 106/486
(58) Field of Search ................. 209/166, 164, 209/5, 10, 39, 12.1; 501/148, 149; 106/486, 487

(56) References Cited

U.S. PATENT DOCUMENTS

| | | |
|---|---|---|
| 2,158,987 | 5/1939 | Maloney . |
| 2,894,628 * | 7/1959 | Duke . |
| 2,990,958 | 7/1961 | Greene et al. ............ 209/166 |
| 2,992,936 | 7/1961 | Rowland . |
| 3,058,671 * | 10/1962 | Billue . |
| 3,085,894 | 4/1963 | Rowland . |
| 3,151,062 * | 9/1964 | Duke . |
| 3,371,988 | 3/1968 | Maynard et al. . |
| 3,450,257 | 6/1969 | Cundy ............ 209/5 |
| 3,701,417 | 10/1972 | Mercade ............ 209/5 |
| 3,743,190 * | 7/1973 | Whitley . |
| 3,837,482 | 9/1974 | Sheridan, III ............ 209/5 |
| 3,857,781 | 12/1974 | Maynard ............ 209/5 |
| 3,861,934 * | 1/1975 | Mallary . |
| 3,862,027 | 1/1975 | Mercade ............ 209/5 |
| 3,979,282 | 9/1976 | Cundy ............ 209/166 |
| 4,227,920 * | 10/1980 | Chapman . |
| 4,472,271 | 9/1984 | Bacon, Jr. ............ 209/167 |
| 4,492,628 | 1/1985 | Young ............ 209/5 |
| 4,604,369 | 8/1986 | Shi . |
| 4,629,556 | 12/1986 | Yoon et al. ............ 209/166 |
| 5,085,707 | 2/1992 | Bundy et al. . |
| 5,154,767 * | 10/1992 | Kunkle . |
| 5,168,083 | 12/1992 | Matthews et al. . |
| 5,393,340 * | 2/1995 | Slepetys . |
| 5,522,986 | 6/1996 | Shi et al. ............ 209/166 |
| 5,535,890 | 7/1996 | Behl et al. ............ 209/5 |

* cited by examiner

Primary Examiner—Thomas M. Lithgow
(74) Attorney, Agent, or Firm—Kennedy, Davis & Hodge, LLP

(57) ABSTRACT

A improved process for beneficiating kaolin clays to remove discoloring impurities is disclosed. The beneficiation of kaolin clay is improved by fractionating a kaolin clay starting material into a lower brightness first fraction having a majority of the discoloring impurities and a higher brightness second fraction with less impurities. The first fraction is then beneficiated (such as by flotation, selection flocculation, high intensity magnetic separation and/or leaching) to produce a kaolin clay product with improved optical properties. The first and second fractions may be combined to produce a product with improved optical properties.

28 Claims, No Drawings

PROCESS FOR BENEFICIATING KAOLIN CLAYS

TECHNICAL FIELD

This invention relates to a process for removing discoloring impurities from kaolin clays. In a more specific aspect, this invention relates to a process for removing discoloring impurities by fractionating a kaolin clay material into a fraction having a majority of the discoloring impurities and another fraction with less impurities, and then separately beneficiating one or both fractions, such as by flotation, selective flocculation or high intensity magnetic separation.

This invention also relates to the beneficiated kaolin clays which are produced by the process of this invention.

BACKGROUND OF THE INVENTION

Kaolin is a naturally occurring, relatively fine, white clay which may be generally described as a hydrated aluminum silicate. Kaolin clay, after purification and beneficiation, is widely used as a filler and pigment in various materials, such as rubber and resins, and in various coatings, such as paints and coatings for paper.

Crude kaolin clay, as mined, contains discoloring impurities such as oxides of titanium and iron. These impurities are principally responsible for the poor whiteness, brightness and color of the crude clay and are often the reasons for rejecting such clay for certain commercial uses.

The use of kaolin as a coating pigment in the paper industry requires high brightness, proper color and gloss, which necessitates the removal of discoloring impurities. In general, wet beneficiation or purification of the kaolin to remove titanium and iron contaminants involves high intensity magnetic separation, froth flotation, selective flocculation and/or leaching. The kaolin is initially dispersed in water, degritted (generally defined in the industry as removal of particles coarser than about 44 microns) and then beneficiated in slurry form.

High intensity magnetic separation involves the use of a magnetic field to remove the impurities with magnetic susceptibility, such as anatase ($TiO_2$), rutile, hematite, mica and pyrite. However, this method is not very effective for removing submicron particles, which decreases the ability of high intensity magnetic separation to produce high brightness kaolin products.

Froth flotation has proven to be an efficient method of removing discoloring impurities from kaolin clays. In froth flotation, the impurity is rendered selectively hydrophobic by a collector (e.g., fatty acid, tall oil, hydroxamate, etc.) after activation in some cases (i.e., conditioning with monovalent, divalent or trivalent cations for tall oil flotation). The hydrophobic particles attach to the air bubbles and are separated from the hydrophilic kaolin in a froth flotation cell or column. The flotation process for removal of discoloring impurities from kaolin is described in U.S. Pat. Nos. 3,450,257; 3,979,282; 4,472,271; 4,492,628; 4,629,556; and 5,522,986.

Another variation of froth flotation involves the use of carrier particles to improve fine particle flotation, as described in U.S. Pat. No. 2,990,958. However, due to the very fine particle size of kaolin clays, especially the fine-grained Tertiary kaolins, froth flotation is complicated and can be inefficient and costly.

Selective flocculation has been more successful in beneficiating fine-grained kaolin clays. Selective flocculation involves activation of the discoloring impurity with poly- valent cations (as described in U.S. Pat. Nos.3,371,988; 3,701,417; 3,837,482; and 3,862,027), conditioning with an ammonium salt (as described in U.S. Pat. No. 4,604,369) or fatty acid and polyvalent cations (as described in U.S. Pat. No. 5,535,890) and then flocculating the impurities with anionic polymers. A disadvantage of this process, however, is the relatively low recoveries.

Another process involves leaching of kaolin clay with iron reducing reagents such as zinc or sodium hydrosulfite. This leaching method is limited to removing iron contaminants only. Other known leaching reagents and/or processes are not generally economical for removing titanium impurities.

The effect of particle size distribution on the optical properties of kaolin clay is described in U.S. Pat. No. 2,158,987. Size classification is commonly used to produce the different grades of kaolin for paper coating and fillers, as well as the other kaolin products for paint, plastics, inks, adhesives and rubber.

The prior art has also used selective fractionation or classification of kaolin by sedimentation or centrifugation into different size ranges to produce a coating pigment of improved opacity, brightness and gloss (U.S. Pat. Nos. 2,992,936 and 3,085,894). Another prior art process uses size classification (i.e., defining or desliming) to remove the fine fraction or colloidal particles from delaminated clays and thereby produce a pigment with a narrower particle size distribution (U.S. Pat. Nos. 5,085,707 and 5,168,083). These processes may include a chemical treatment (such as by addition of an amine and aluminum sulfate) to produce the final product. However, these processes have not used classification to improve the efficiency, reduce the cost, lower reagent demand or broaden the application of the beneficiation process in removing discoloring impurities from kaolin clays.

Well known in the industry is the wet processing of kaolin to degrit crude kaolin after dispersing the crude kaolin into slurry form. Degritting involves removing the coarse particles or grit by screening, gravity sedimentation and/or the use of a cyclone separator. Although degritting removes some of the impurities such as rutile, pyrite, marcasite, quartz, muscovite, kyanite, etc., the main objective of degritting is to remove the coarse particles which are not acceptable in kaolin clay formulations used as pigments or fillers.

Due to the limitations of the prior art beneficiation processes in removing discoloring impurities from kaolin clays, there is a need to develop a process that is more efficient and cost effective. Also, there is a need for a process that will more effectively beneficiate the fine-grained kaolin clays.

SUMMARY OF THE INVENTION

The discoloring impurities in kaolin clays, especially iron-stained anatase and iron oxides, are primarily concentrated in certain size fractions of the kaolin. In fine-grained kaolin clays, the coarser fraction contains the majority of these impurities, while the opposite is true for the coarse-grained kaolins. Thus, the fraction with the majority of discoloring impurities is lower in brightness compared to the other fraction. The decrease in brightness with increasing $TiO_2$ content is described in U.S. Pat. No. 3,857,781.

Briefly described, the present invention provides a process for the beneficiation of a starting kaolin clay material which contains discoloring impurities. The present invention provides an improved process for the beneficiation of such kaolin clay materials by fractionating a kaolin clay slurry into first and second fractions, wherein the first fraction has a majority of the discoloring impurities, and then beneficiating the first fraction to remove the discoloring impurities. The fractions may then be combined to produce a kaolin clay product having optical properties which are improved over those of the starting kaolin clay material.

Additionally, the combined product can be beneficiated (such as by classification, high intensity magnetic separation, flotation, selective flocculation and/or leaching) to modify the final product properties.

Another variation of the present invention is to beneficiate the higher brightness fraction (the fraction with less impurities) and produce a product with enhanced optical properties as compared to the combined product, the processed lower brightness fraction or the processed whole fraction.

In the present invention, size fractionation of the kaolin will result in processing the fraction that will most benefit from beneficiation, which is the fraction where the majority of the discoloring impurities is present.

When working with fine-grained Tertiary kaolin clays, size fractionation will result in beneficiation of the coarser fraction, which contains the majority of the discoloring impurities. As a result, flotation, selective flocculation or magnetic separation will be more efficient in beneficiating fine-grained kaolin clays.

Another advantage of the present invention is that the beneficiation costs can be substantially decreased when a certain fraction of the kaolin is processed. Subjecting a certain fraction of the kaolin clay to the beneficiation step will increase the overall recovery of the process since beneficiation methods such as froth flotation or selective flocculation of fine-grained kaolins typically result in a lower clay recovery and require increased amounts of reagent.

In the present invention, processing the high brightness fraction will result in a less intensive beneficiation since this fraction initially has a lesser amount of discoloring impurities. This process will be more efficient, less complicated and less costly than beneficiating the whole fraction and will require lower amounts of reagent.

Accordingly, an object of this invention is to provide a process for the beneficiation of kaolin clay.

Another object of this invention is to provide a process for the beneficiation of kaolin clay wherein the beneficiated product has improved optical properties.

Another object of this invention is to provide a process for the beneficiation of kaolin clay wherein the kaolin clay is fractionated into a lower brightness fraction and a higher brightness fraction.

Another object of this invention is to provide a process in which the lower brightness fraction is conditioned for subsequent removal of discoloring impurities.

Another object of this invention is to provide a process in which the higher brightness fraction is beneficiated to produce a beneficiated product with enhanced optical properties.

Still another object of this invention is to provide a process for the beneficiation of kaolin clays in which a lesser amount of reagent is required for the beneficiation step.

Still another object of this invention is to provide a process for the beneficiation of kaolin clays in which the process conditions can be modified to provide products with varying particle size distributions.

Still another object of this invention is to provide a process in which the fractions are combined after removal of discoloring impurities from the lower brightness fraction.

Still another object of this invention is to provide a kaolin clay product from which discoloring impurities have been removed.

Still another object of this invention is to provide a kaolin clay product having optical properties which are improved when compared to the optical properties of the starting kaolin clay material.

Still another object of this invention is to provide a beneficiated product in which the particle size distribution can be modified to meet various product specifications.

These and other objects, features and advantages of the invention will become apparent from the following detailed description.

DETAILED DESCRIPTION OF THE INVENTION

In accordance with the present invention, a starting kaolin clay material is dispersed; fractionated into higher and lower brightness fractions; the lower brightness fraction is then beneficiated to remove discoloring impurities and produce a kaolin clay product having optical properties which are improved over the optical properties of the starting kaolin clay material. Alternatively, the beneficiated fraction may be combined with the higher brightness fraction to produce a kaolin clay product with optical properties which are improved over the optical properties of the starting kaolin clay material.

Chemical analyses of different kaolins generally show a trend in the size distribution of discoloring impurities, specifically titania ($TiO_2$) and iron oxide. In the fine-grained Tertiary kaolin clays (e.g., fine-grained kaolins from East Georgia, U.S.A.), the amount of $TiO_2$ present in the kaolin crude increases with increasing particle size. Consequently, the crude brightness decreases with increasing particle size while the Hunter b-value increases as the particles get coarser.

A reverse trend is observed in the coarse-grained Cretaceous kaolin clays (e.g., coarse-grained kaolins from Middle Georgia, U.S.A.). The finer fractions of these kaolin clays contain more $TiO_2$ and iron oxides and are accordingly poorer in optical properties.

The present invention uses this inherent property of kaolin clays to improve efficiency, increase tonnage, reduce reagent demand and broaden the application of different beneficiation methods available in the kaolin industry (e.g., flotation, selective flocculation, high intensity magnetic separation, leaching, etc.).

In accordance with the present invention, the kaolin beneficiation process is improved by a method which preferably comprises the sequential steps of:

A. preparing a dispersed aqueous slurry of a starting or feed kaolin clay material which contains discoloring impurities;

B. fractionating or classifying the aqueous slurry by centrifugation into a first fraction (lower brightness fraction) containing a majority of the discoloring impurities (e.g., coarse fraction of a fine grained Tertiary kaolin, fine fraction of a coarse-grained Cretaceous kaolin, etc.) and a second fraction (higher brightness fraction) containing a minority of the discoloring impurities (e.g., fine fraction of a fine-grained Tertiary kaolin, coarse fraction of a coarse-grained Cretaceous kaolin, etc.);

C. adjusting the dispersion of the lower brightness fraction as needed;

D. conditioning the lower brightness first fraction for beneficiation (e.g., mixing with a collector for flotation, mixing with an activator and flocculant for selective flocculation, mixing with a magnetic reagent for magnetic separation, mixing with a leaching reagent, etc.);

E. subjecting the conditioned first fraction to a beneficiation process (e.g. froth flotation, selective flocculation, magnetic separation, leaching, etc.); and F. combining the beneficiated first fraction with the higher brightness second fraction to produce a kaolin clay product having optical properties which are improved over those of the starting material.

The kaolin clay product of this invention may be subjected to further processing, such as beneficiation.

The present invention will be described in detail for beneficiating the fine-grained Tertiary kaolin clays from East Georgia, U.S.A. Discoloring impurities in this type of kaolin are predominantly titania and iron oxides, with the $TiO_2$ present in the range of 2–4.5% by weight, while $Fe_2O_3$ is normally about 1% by weight. The particle size of a typical fine-grained East Georgia clay varies from 80% less than 2 microns e.s.d. (equivalent spherical diameter) to greater than 95% less than 2 microns e.s.d. Due to the fine particle size of these clays, prior art beneficiation methods are not efficient in removing the discoloring impurities.

In this invention, the kaolin clay is first dispersed with the required dispersant chemistry for the beneficiation process. For froth flotation with tall oil as the collector, the dispersant used can be sodium silicate or sodium polyacrylate with ammonium hydroxide added as the pH modifier, while froth flotation with hydroxamate as the collector can use sodium silicate as the dispersant. In the case of selective flocculation, sodium hexametaphosphate and sodium metasilicate or soda ash are normally used in dispersing the kaolin clay. Using magnetic separation, the kaolin clay is usually dispersed with sodium hexametaphosphate.

After dispersion of the fine-grained kaolin clay, the slurry is diluted with water to 10–40% solids and classified in a centrifuge to obtain a first coarser fraction containing a minority of the particles of less than 0.2 microns (lower brightness fraction) and a second finer fraction containing a majority of the particles of less than 0.2 microns (higher brightness fraction). The dispersion of the slurry containing the lower brightness fraction is then adjusted as needed and conditioned for the time required with the appropriate reagents for the particular beneficiation process. The conditioned slurry is then subjected to the beneficiation process, and the beneficiated fraction obtained may be combined with the other fraction to produce a final product with or without additional processing (e.g., magnetic separation, leaching, classification, etc.). The beneficiated fraction may also be the final product (i.e., not combined with the other fraction) with improved optical, rheological and/or paper coating properties over the combined or whole fraction products.

The present invention also contemplates the processing of the higher brightness fraction. With the fine-grained East Georgia kaolin, the dispersion of the finer fraction (higher brightness fraction) is adjusted as needed, and the slurry is conditioned. The conditioned slurry is then subjected to a beneficiation process to produce a product having optical properties which are improved over the combined or whole fraction products.

As noted earlier in this application, the conditions of our process can be modified to provide products with varying particle size distributions. Consequently, this process flexibility can be advantageously used to provide different products for applications in which different particle size distributions are specified by the purchaser. Particle size distribution data is presented for certain of the following examples.

The present invention is further illustrated by the following examples which are illustrative of certain embodiments designed to teach those of ordinary skill in the art how to practice this invention and to represent the best mode contemplated for practicing this invention.

EXAMPLE 1

A control sample is prepared from a fine-grained East Georgia crude kaolin clay (Crude A) by a conventional selective flocculation process. A 2000 gm sample of Crude A is dispersed in water to 60% solids with 6 lb/ton sodium hexametaphosphate (SHMP) and 5.7 lb/ton of sodium metasilicate. The slurry is conditioned with 2.0 lb/ton ammonium chloride in a Hockemeyer mixer for 9 minutes. The conditioned slurry is then diluted to 20% solids, and 0.04 lb/ton PERCOL 730 (an anionic polymeric flocculant available from Allied Colloids Co., Suffolk, Va.) is added. The slurry is agitated lightly for 2 minutes and gravity settled for 5 minutes per inch depth of slurry. The white clay suspension is siphoned off after settling, coagulated with 16 lb/ton of aluminum sulfate and sulfuric acid to pH 3.5, leached with 9 lb/ton of sodium hydrosulfite, filtered and dried. The dried sample is pulverized and analyzed for brightness and color, XRF elemental analysis and particle size distribution. The results for the control sample are shown in Tables A and A2.

For the process of this invention (Example 1), 4000 grams of Crude A are blunged in water at 60% solids with 5 lb/ton of sodium hexametaphosphate and 5.7 lb/ton sodium metasilicate using a Cowles dissolver for 6 minutes. After blunging, the dispersed slurry is screened through a 270 mesh screen and diluted to 30% solids. The diluted slurry is fractionated in a centrifuge to produce a coarser fraction (lower brightness fraction) containing 12% <0.2 micron particles and a finer fraction (higher brightness fraction) containing 62% <0.2 micron particles. The recovery from the centrifuge is 52% fines and 48% coarse. The viscosity of the coarse fraction is adjusted with 1 lb/ton SHMP and conditioned with 2 lb/ton of ammonium chloride in a Cowles dissolver for 7 minutes. The conditioned slurry is diluted to 20% solids, 0.05 lb/ton PERCOL 730 is added, and the slurry is then agitated lightly. After gravity settling, the clay product remaining in suspension is recovered, coagulated, leached, filtered and dried at the same conditions used for the control sample. The fine fraction is also coagulated, leached, filtered and dried similarly. The coarse and fine fractions are then combined to produce the final product. Since the recovery for the selective flocculation of the coarse fraction is 34%, the combined product has a new blend ratio of coarse:fine fraction of 24:76. The results of the analyses of the fractionated and combined products are given in Tables A and A2.

As shown in Table A, the brightness and color of the coarse fraction improves (from GE brightness of 76.3 to 88.4 and from Hunter b-value of 7.81 to 3.57) as a result of the $TiO_2$ removal by selective flocculation. The fine fraction (higher brightness fraction) produces high brightness with leaching only since this fraction contains less impurities than the crude starting material and has a starting brightness of 86.8.

While similar in optical properties to the Control 1 Product, the resulting Combined Product from the coarse and fine fractions shows an improved clay recovery.

Although recovery of the selective flocculation of the coarse fraction is only 34%, the overall recovery is 68% since only 48% of the crude feed is subjected to selective flocculation. Thus, the present invention provides a better recovery and lower processing costs, and a high brightness fine fraction is obtained with minimal processing.

A significant advantage of the present invention is shown by the reagent demand of the Control 1 Product when compared to the reagent demand of the Combined Product. Specifically, the reagent demand calculations for Example 1 are as follows:

|  | Ammonium Chloride (lb/ton feed clay) | PERCOL 730 (lb/ton feed clay) |
|---|---|---|
| Control 1 Product | 2.00 | 0.04 |
| Combined Product | 0.96 | 0.024 |

TABLE A

| Sample | % TiO$_2$ | G.E. Brightness | Hunter b-value | % Clay Recovery |
|---|---|---|---|---|
| Crude A |  |  |  |  |
| Coarse Fraction | 3.26 | 76.3 | 7.81 | 48 |
| Fine Fraction | 1.53 | 86.8 | 4.11 | 52 |
| Whole Fraction | 2.30 | 82.3 | 5.89 | — |
| Control 1 Product | — | 89.4 | 3.14 | 65 |
| Example 1 Products |  |  |  |  |
| Coarse Fraction Product | 1.31 | 88.4 | 3.57 | 34 |
| Fine Fraction Product | 1.53 | 89.4 | 2.92 | 100 |
| Combined Product | 1.49 | 89.3 | 3.16 | 68 |

TABLE A2

Particle Size Distribution

| Sample | Particle Size Distribution, % less than ($\mu$m) | | | |
|---|---|---|---|---|
|  | 2 | 1 | 0.5 | 0.2 |
| Control 1 Product | 98 | 97 | 87 | 48 |
| Example 1 Products |  |  |  |  |
| Coarse Fraction Product | 98 | 98 | 84 | 19 |
| Fine Fraction Product | 98 | 98 | 96 | 61 |
| Combined Product | 98 | 98 | 93 | 51 |

Table A2 presents the particle size distributions of the Example 1 Products and the Control 1 Product. The products of the present invention obtained from the various fractions have particle size distributions which are different from the Control 1 Product and from each other.

The Coarse Fraction Product contains a minority of the 0.5 and 0.2 $\mu$m particles, while the opposite is true for the Fine Fraction Product which contains a majority of such particles. The particle size distribution of the various fractions can be modified by changing the fractionation conditions in the centrifuge; thus, the various fractions can have coarser or finer particle size distributions than those given in Table A2. This flexibility is shown by the different particle size distributions obtained for the various fractions shown in Table A2. Also, the Combined Product can have a particle size distribution which is either similar to or different from the Control 1 Product, as shown in Table A2, by adjusting the amount of coarse and fine fractions (i.e., blend ratio of coarse:fine fraction) in the Combined Product. For example, using a blend ratio of coarse:fine fraction of 50:50, instead of the 24:76 used in Example 1, the calculated amount of 0.5 $\mu$m particles would change from 93 to 90%, while the calculated amount of the 0.2 $\mu$m particles would change from 51 to 40%. This data further shows the flexibility of the present invention in making products with different particle size distributions.

EXAMPLE 2

Another control sample is prepared from Crude A by a modified selective flocculation process which uses alkyl hydroxamate, as described in copending Shi, Williams, Lowe & Basilio U.S. patent application Ser. No. 09/045,842, filed Mar. 20, 1998 and entitled "Beneficiation With Selective Flocculation Using Hydroxamates" (now U.S. Pat. No. 6,041,939, issued Mar. 28, 2000), to condition the slurry prior to selective flocculation with an anionic polymeric flocculant. For this control sample, 2000 grams of Crude A are dispersed in water to 60% solids with 7.4 lb/ton sodium silicate and 1.85 lb/ton sodium hydroxide in a Hockemeyer mixer for 4 minutes. After blunging, 2 lb/ton S-6493 Mining Reagent (an alkyl hydroxamate available from Cytec Industries, Inc., West Paterson, N.J.) is added, and the slurry is conditioned in a Hockemeyer mixer for 12 minutes. The conditioned slurry is then diluted to 20% solids, and 1 lb/ton SHMP and 0.025 lb/ton SHARPFLOC 9450 (an anionic polymeric flocculant available from Sharpe Specialty Chemicals Co., Macon, Ga.) are added. The slurry is then agitated lightly for 2 minutes and gravity settled for 5 minutes per inch depth of slurry. The clay product suspension is siphoned off after settling, coagulated with 16 lb/ton of aluminum sulfate and sulfuric acid to pH 3.5, leached with 9 lb/ton of sodium hydrosulfite, filtered and dried. The dried sample is pulverized and analyzed for brightness and color and XRF elemental analysis.

For the process of this invention (Example 2), 4000 grams of Crude A are blunged in water at 55% solids with 6 lb/ton sodium silicate and 2 lb/ton sodium hydroxide in a Cowles dissolver for 6 minutes. After blunging, the dispersed slurry is screened through a 270 mesh screen and diluted to 30% solids. The diluted slurry is fractionated in a centrifuge to produce a coarse fraction (lower brightness fraction) containing 15% <0.2 micron particles and a fine fraction (higher brightness fraction) containing 61% <0.2 micron particles. The recovery from the centrifuge is 53% fines and 47% coarse. The coarse fraction is redispersed with 1.9 lb/ton sodium silicate and conditioned with 2 lb/ton S-6493 Mining Reagent in a Cowles dissolver for 12 minutes. The conditioned slurry is diluted to 20% solids, 1 lb/ton SHMP and 0.1 lb/ton SHARPFLOC 9230 H (an anionic polymeric flocculant available from Sharpe Specialty Chemicals Co., Macon, Ga.) are added, and the slurry is then agitated lightly for 2 minutes. The white clay product remaining in suspension and the fine fraction are then processed as described for the control sample. The coarse and fine products are then combined to produce the final product. The combined product has a new blend ratio of coarse:fine fraction of 27:73.

The results of the analyses of the different products are shown in Table B. As shown, both coarse and fine fractions produce high brightness after processing. After combination, the product of the present invention has improved brightness and color over the Control 2 Product, with a better recovery. Since only 47% of the feed crude is beneficiated by selective flocculation, the process of the present invention has reduced the reagent demand and lowered processing costs.

The reagent demand calculations for Example 2 are as follows:

|  | S-6493 Mining Reagent (lb/ton feed clay) |
| --- | --- |
| Control 2 Product | 2.0 |
| Combined Product | 0.94 |

|  | S-6493 Mining Reagent (lb/ton feed clay) |
| --- | --- |
| Control 3 Product | 3.0 |
| Combined Product | 1.12 |

TABLE B

| Sample | % TiO$_2$ | G.E. Brightness | Hunter b-value | % Clay Recovery |
| --- | --- | --- | --- | --- |
| Crude A |  |  |  |  |
| Coarse Fraction | 2.69 | 82.1 | 5.83 | 47 |
| Fine Fraction | 1.51 | 86.4 | 3.27 | 53 |
| Whole Fraction | 2.13 | 84.8 | 4.47 | — |
| Control 2 Product | — | 89.2 | 3.11 | 71 |
| Example 2 Products |  |  |  |  |
| Coarse Fraction Product | 0.96 | 91.0 | 2.50 | 41 |
| Fine Fraction Product | 1.50 | 89.3 | 3.22 | 100 |
| Combined Product | 1.35 | 89.7 | 3.04 | 72 |

TABLE C

| Sample | % TiO$_2$ | G.E. Brightness | Hunter b-value | % Clay Recovery |
| --- | --- | --- | --- | --- |
| Crude B |  |  |  |  |
| Coarse Fraction | 2.79 | 81.0 | 6.35 | 56 |
| Fine Fraction | 2.04 | 84.2 | 4.22 | 44 |
| Whole Fraction | 2.58 | 82.5 | 5.37 | — |
| Control 3 Product | 1.23 | 89.6 | 2.76 | 73 |
| Example 3 Products |  |  |  |  |
| Coarse Fraction Product | 0.66 | 91.0 | 2.50 | 57 |
| Fine Fraction Product | 2.01 | 89.5 | 3.16 | 100 |
| Combined Product | 1.24 | 89.8 | 3.01 | 76 |

EXAMPLE 3

A set of tests is carried out on a fine-grained East Georgia kaolin clay (Crude B) using the modified selective flocculation process described in Example 2. For this control sample, 2000 grams of Crude B are dispersed in water to 55% solids with 5.2 lb/ton sodium silicate and 1.85 lb/ton sodium hydroxide in a Hockemeyer mixer for 4 minutes. Conditioning is carried out by adding 3 lb/ton S-6493 Mining Reagent and mixing for 9 minutes. The conditioned slurry is diluted to 20% solids, and 1 lb/ton SHMP and 0.05 lb/ton SHARPFLOC 9230 H are added. The slurry is then agitated lightly for 2 minutes and settled for 5 minutes per inch depth of slurry. The product is recovered after settling, processed and analyzed as described in Example 1.

For the process of this invention (Example 3), 4000 grams of Crude B are dispersed at 55% solids with 5.2 lb/ton sodium silicate and 1.85 lb/ton sodium hydroxide in a Cowles dissolver for 6 minutes. The dispersed slurry is then degritted, diluted to 30% solids and fractionated to produce a coarse fraction (lower brightness fraction) containing 10% <0.2 micron particles and a fine fraction (higher brightness fraction) containing 62% <0.2 micron particles. Recovery for the size fractionation is 44% fines and 56% coarse. The coarse fraction is conditioned with 2 lb/ton of S-6493 Mining Reagent for 12 minutes and diluted to 20% solids. Selective flocculation is conducted by adding 1 lb/ton SHMP and 0.025 lb/ton SHARPFLOC 9230 H to the coarse fraction slurry, then agitating lightly for 2 minutes and gravity settling. The coarse clay product is recovered, processed and analyzed as described in Example 1. The coarse and processed fine products are then combined to produce the final product with a ratio of coarse:fine fraction of 42:58.

Tables C and C2 show the results of the analyses of the different products. The Example 3 Combined Product of the present invention has somewhat similar brightness and color as the Control 3 Product; however, the clay recovery is improved with the present invention. As shown, use of the present invention results in reduced reagent demand and lowered processing costs, and a high brightness fine fraction product is obtained with minimal processing.

The reagent demand calculations for Example 3 are as follows:

TABLE C2

Particle Size Distribution

| | Particle Size Distribution, % less than ($\mu$m) | | | |
| --- | --- | --- | --- | --- |
| Sample | 2 | 1 | 0.5 | 0.2 |
| Control 3 Product | 99 | 98 | 89 | 42 |
| Example 3 Products |  |  |  |  |
| Coarse Fraction Product | 97 | 92 | 66 | 10 |
| Fine Fraction Product | 97 | 97 | 95 | 62 |
| Combined Product | 97 | 95 | 83 | 42 |

Table C2 presents the particle size distributions of the Example 3 Products and the Control 3 Product. The products of the present invention obtained from the various fractions have particle size distributions which are different from the Control 3 Product and from each other.

The Coarse Fraction Product contains a minority of the 0.5 and 0.2 $\mu$m particles, while the opposite is true for the Fine Fraction Product which contains a majority of such particles. The particle size distribution of the various fractions can be modified by changing the fractionation conditions in the centrifuge; thus, the various fractions can have coarser or finer particle size distributions than those given in Table C2. This flexibility is shown by the different particle size distributions obtained for the various fractions shown in Table C2. Also, the Combined Product can have a particle size distribution which is either similar to or different from the Control 3 Product, as shown in Table C2, by adjusting the amount of coarse and fine fractions (i.e., blend ratio of coarse:fine fraction) in the Combined Product. This data further shows the flexibility of the present invention in making products with different particle size distributions.

EXAMPLE 4

The fine fraction produced from the fractionation of Crude A in Example 2 is beneficiated by selective flocculation to produce a high brightness kaolin product. The fine fraction is redispersed with sodium silicate and conditioned with 2 lb/ton S-6493 Mining Reagent for 12 minutes. The conditioned slurry is diluted to 20% solids, and 1 lb/ton SHMP and 0.05 lb/ton SHARPFLOC 9230 H are added. The slurry is then agitated lightly for 2 minutes and gravity settled. After settling, the suspended fine clay product is recovered and processed as described in Examples 1–3. The fine product obtained shows high brightness and a low Hunter b-value (see Table D). This new high brightness fine product is obtained with excellent recovery.

TABLE D

| Sample | % TiO$_2$ | G.E. Brightness | Hunter b-value | % Clay Recovery |
| --- | --- | --- | --- | --- |
| Crude A Fine Fraction | 1.51 | 86.4 | 3.27 | — |
| Example 4 Product | — | 91.9 | 2.18 | 75 |

EXAMPLE 5

In this example, the use of the present invention in magnetic separation is presented. The Magnet Control Product is prepared from a fine-grained East Georgia crude (Crude A) by dispersing 2000 grams of Crude A in water to 50% solids with 6 lb/ton sodium silicate and 2 lb/ton sodium hydroxide using a Cowles mixer for 4 minutes. The dispersed slurry is then diluted to 30% solids with water and passed through a laboratory magnetic separator. The magnetic separator settings were 5 tesla and 1 minute retention time. After magnetic separation, the slurry is coagulated with 16 lb/ton of aluminum sulfate and sulfuric acid to pH 3.5, leached with 9 lb/ton of sodium hydrosulfite, filtered and dried. The dried sample is pulverized and analyzed for brightness and color, TiO$_2$ analysis and particle size distribution.

For Example 5, Crude A is prepared and fractionated as described for the process of this invention in Example 2. The coarse fraction (lower brightness fraction) is diluted to 30% solids and subjected to magnetic separation. The magnetic separator is set at 5 tesla and 1 minute retention time. A portion of the magnetic separator product is then leached and filtered as described for the Magnet Control Product and then analyzed. The remainder of the magnetic separator product is combined with the fine fraction (higher brightness fraction) and processed as described for the Magnet Control Product. The Combined Product has a new blend ratio of coarse:fine fractions of 35:65. The results of the analysis of the control, fractionated and combined products are given in Tables E and E2.

The brightness and color of the coarse fraction improves with the use of magnetic separation. The Combined Product produced by the present invention shows similar optical properties as the Magnet Control Product, but with improved recovery. Again, this improved recovery is obtained because only the coarse fraction (lower brightness fraction) which contains a majority of the discoloring impurities, is subjected to magnetic separation. Thus, the use of the present invention allows for lower processing costs and higher clay recoveries.

TABLE E

| Sample | % TiO$_2$ | G.E. Brightness | Hunter b-value | % Clay Recovery |
| --- | --- | --- | --- | --- |
| Crude A | | | | |
| Coarse Fraction | 2.69 | 82.1 | 5.83 | 47 |
| Fine Fraction | 1.51 | 86.4 | 3.27 | 53 |

TABLE E-continued

| Sample | % TiO$_2$ | G.E. Brightness | Hunter b-value | % Clay Recovery |
| --- | --- | --- | --- | --- |
| Whole Fraction | 2.13 | 84.8 | 4.47 | — |
| Magnet Control Product | 1.64 | 89.9 | 3.28 | 57 |
| Example 5 Products | | | | |
| Coarse Fraction Product | 1.48 | 89.3 | 3.29 | 60 |
| Fine Fraction Product | 1.52 | 90.5 | 2.73 | 100 |
| Combined Product | 1.53 | 89.9 | 3.41 | 81 |

TABLE E2

Particle Size Distribution

| | Particle Size Distribution, % less than ($\mu$m) | | | |
| --- | --- | --- | --- | --- |
| Sample | 2 | 1 | 0.5 | 0.2 |
| Control 5 Product | 95 | 93 | 85 | 45 |
| Example 5 Products | | | | |
| Coarse Fraction Product | 94 | 88 | 72 | 33 |
| Fine Fraction Product | 98 | 97 | 93 | 50 |
| Combined Product | 96 | 93 | 86 | 44 |

Table E2 presents the particle size distributions of the Example 5 Products and the Control 5 Product. The products of the present invention obtained from the various fractions have particle size distributions which are different from the Control 5 Product and from each other.

The Coarse Fraction Product contains a minority of the 0.5 and 0.2 $\mu$m particles, while the opposite is true for the Fine Fraction Product which contains a majority of such particles. The particle size distribution of the various fractions can be modified by changing the fractionation conditions in the centrifuge; thus, the various fractions can have coarser or finer particle size distributions than those given in Table E2. This flexibility is shown by the different particle size distributions obtained for the various fractions shown in Table E2. Also, the Combined Product can have a particle size distribution which is either similar to or different from the Control 5 Product, as shown in Table E2, by adjusting the amount of coarse and fine fractions (i.e., blend ratio of coarse:fine fraction) in the Combined Product. This data further shows the flexibility of the present invention in making products with different particle size distributions.

This invention has been described in detail with particular reference to certain embodiments, but variations and modifications can be made without departing from the spirit and scope of the invention as defined in the following claims.

What is claimed is:

1. A process for the beneficiation of a kaolin clay material, wherein the process comprises the sequential steps of:

A. obtaining a dispersed aqueous slurry of a kaolin clay starting material which contains discoloring impurities;

B. fractionating the aqueous slurry into a first fraction having a majority of the discoloring impurities and a second fraction having a minority of the discoloring impurities; and C. beneficiating the first fraction to remove the discoloring impurities and produce a kaolin clay product, wherein the optical properties of the kaolin clay product are improved over the optical properties of the kaolin clay starting material and wherein the process is conducted in the absence of grinding.

2. A process as defined by claim 1 wherein the starting material is a fine-grained kaolin clay.

3. A process as defined by claim 1 wherein the starting material is a coarse-grained kaolin clay.

4. A process as defined by claim 1 wherein the discoloring impurities are iron-stained anatase and iron oxides.

5. A process as defined by claim 1 wherein the fractionation is by centrifugation.

6. A process as defined by claim 1 wherein the beneficiation step is by flotation, selective flocculation, high intensity magnetic separation, leaching or a combination thereof.

7. A process as defined by claim 6 wherein the beneficiation step is by flotation.

8. A process as defined by claim 6 wherein the beneficiation step is by selective flocculation.

9. A process as defined by claim 6 wherein the beneficiation step is by high intensity magnetic separation.

10. A process as defined by claim 6 wherein the beneficiation step is by leaching.

11. A process as defined by claim 1 wherein the beneficiated first fraction and the second fraction are combined to produce a kaolin clay product having optical properties which are improved over the optical properties of the kaolin clay starting material.

12. A process as defined by claim 1 wherein the second fraction is beneficiated by flotation, selective flocculation, high intensity magnetic separation, leaching or a combination thereof.

13. A process as defined by claim 12 wherein the beneficiated first fraction and the beneficiated second fraction are combined to produce a kaolin clay product having optical properties which are improved over the optical properties of the kaolin clay starting material.

14. A process as defined by claim 11 wherein the combined product is beneficiated by flotation, selective flocculation, high intensity magnetic separation, leaching or a combination thereof.

15. A kaolin clay product which is produced by a process comprising the sequential steps of:
   A. obtaining a dispersed aqueous slurry of a kaolin clay starting material which contains discoloring impurities;
   B. fractionating the aqueous slurry into a first fraction having a majority of the discoloring impurities and a second fraction having a minority of the discoloring impurities; and
   C. beneficiating the first fraction to remove the discoloring impurities and produce a kaolin clay product, wherein the optical properties of the kaolin clay product are improved over the optical properties of the kaolin clay starting material and wherein the process is conducted in the absence of grinding.

16. A kaolin clay product as defined by claim 15 wherein the starting material is a fine-grained kaolin clay.

17. A kaolin clay product as defined by claim 15 wherein the starting material is a coarse-grained kaolin clay.

18. A kaolin clay product as defined by claim 15 wherein the discoloring impurities are iron-stained anatase and iron oxides.

19. A kaolin clay product as defined by claim 15 wherein the fractionation is by centrifugation.

20. A kaolin clay product as defined by claim 15 wherein the beneficiation step is by flotation, selective flocculation, high intensity magnetic separation, leaching or a combination thereof.

21. A kaolin clay product as defined by claim 20 wherein the beneficiation step is by flotation.

22. A kaolin clay product as defined by claim 20 wherein the beneficiation step is by selective flocculation.

23. A kaolin clay product as defined by claim 20 wherein the beneficiation step is by high intensity magnetic separation.

24. A kaolin clay product as defined by claim 20 wherein the beneficiation step is by leaching.

25. A kaolin clay product as defined by claim 15 wherein the beneficiated first fraction and the second fraction are combined to produce a kaolin clay product having optical properties which are improved over the optical properties of the kaolin clay starting material.

26. A kaolin clay product as defined by claim 15 wherein the second fraction is beneficiated by flotation, selective flocculation, high intensity magnetic separation, leaching or a combination thereof.

27. A kaolin clay product as defined by claim 26 wherein the beneficiated first fraction and the beneficiated second fraction are combined to produce a kaolin clay product having optical properties which are improved over those of the kaolin clay starting material.

28. A kaolin clay product as defined by claim 25 wherein the combined product is beneficiated by flotation, selective flocculation, high intensity magnetic separation, leaching or a combination thereof.

\* \* \* \* \*